April 14, 1931.  G. H. TABER  1,800,483
VEHICLE SPRING CONTROL
Filed March 6, 1929  2 Sheets-Sheet 1
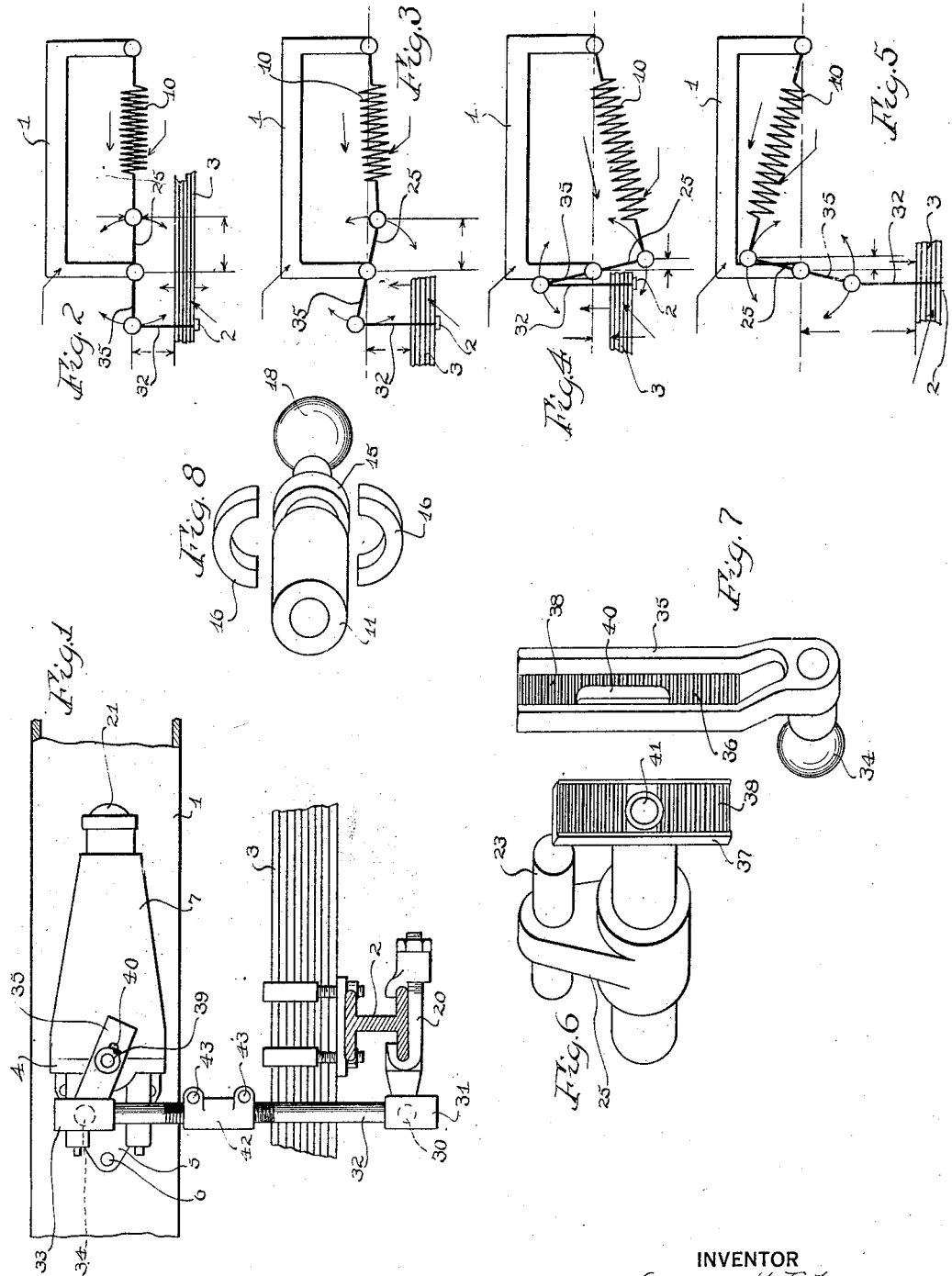
INVENTOR
George H. Taber
BY
ATTORNEY

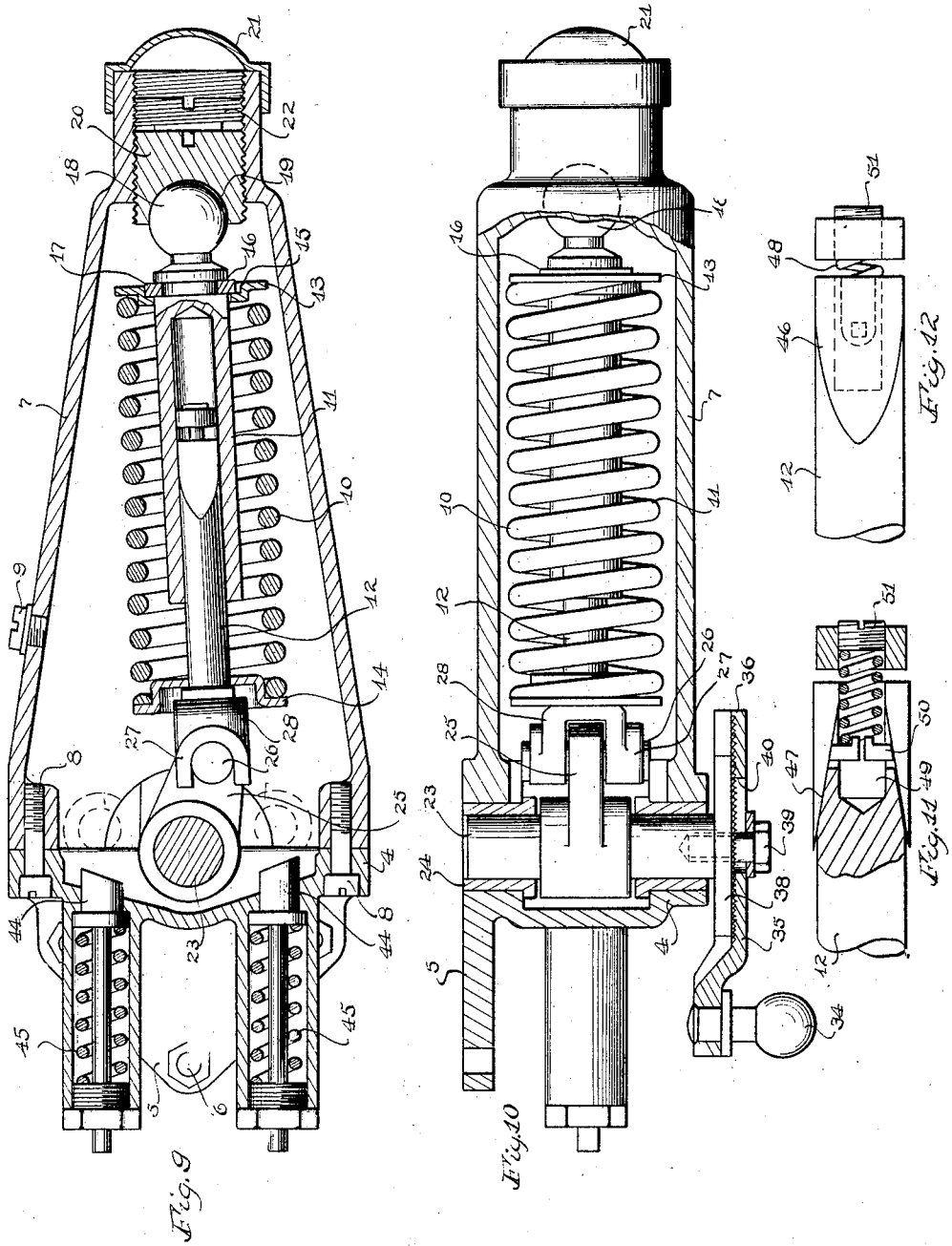

Patented Apr. 14, 1931

1,800,483

UNITED STATES PATENT OFFICE

GEORGE H. TABER, OF BINGHAMTON, NEW YORK

VEHICLE SPRING CONTROL

Application filed March 6, 1929. Serial No. 344,727.

The present invention relates to a vehicle spring control. An object is to prevent the shocks to a running gear of a wheeled vehicle being transmitted to the body or frame of the vehicle and to give more uniformity to the flexibility of a spring. Another object of the invention is to provide a means which will assist the movement between the frame and the axle of a vehicle away from normal position when a tendency is developed for such movement by bumps or depressions in the roadway. Still another object of this invention is to provide a construction having a single means for increasing the strength of the spring as the frame and an axle separates and for weakening the action of the spring as the frame and the axle move toward each other, both from a normal position. A further object of the invention is to employ means in which energy is stored which is connected to the frame and the axle in such a manner that as the frame and the axle move toward each other the means will expand and weaken the action of the vehicle spring and when the frame and the axle separate the spring means will expand and strengthen the action of the spring and in this way prevent the shock being transmitted from the running gear to the body of the vehicle. A still further object of the invention is to employ a spring control means which gives an additional resilient support to the frame when the axle and the frame are separated the amount of such additional support varying with the amount of separating movement. Still another and further object of the invention is to provide in connection with the invention is to provide in connection with means having energy stored therein for varying the action of the spring upon the relative movement of the frame and the axle in either direction, a retarding means which acts upon the return of the axle and frame to normal position from either of two positions. A further object of the invention is to provide a novel means for limiting the relative movement between the axle and the frame in two directions. A still further object of the invention is to provide a novel means for regulating the relative movement between the frame and the axle to determine the required movement between them in two directions, so as to prevent contact between the frame and axle in one direction and spring breakage in the other direction.

To these and other ends, the invention consists of certain parts and combinations of parts all of which will be hereinafter described; the novel features being pointed out in the appended claims.

In the drawings:

Fig. 1 is a fragmentary view showing portions of a vehicle to which the present portion is connected;

Figs. 2 to 5 are diagrammatic views showing the different positions of the invention and the changes in lever relation;

Fig. 6 is a perspective view of the swinging member;

Fig. 7 is a perspective view of the adjustable part on the swinging member to which the thrust connection is pivoted;

Fig. 8 is a fragmentary perspective view of a portion of the energized spring support;

Fig. 9 is a vertical longitudinal section through the energized spring and its housing;

Fig. 10 is a longitudinal horizontal section of the same with parts in elevation;

Fig. 11 is a fragmentary sectional view of the retarding means; and

Fig. 12 is a fragmentary view of the retarding means in plan.

The common shock absorber for motor vehicles is based upon the principle of resisting through any suitable means the shock received by the vehicle. This resisting means forms a tie or substantially a rigid connecting means between the axle and the vehicle body and while reducing the shock, still transmits it to the body to a large extent. In this invention the spring has associated with it a means which tends to increase the strength of the spring upon the separation of the body and the axle as when the wheels move in a depression or hollow and which tends to weaken the action of the spring when the axle and body move toward each other as when the wheels strike an elevation or projection, or in other words, when the body and the axle move relatively to each other from normal position in either direction, this movement is assisted instead of being resisted as in a common shock absorber. This means, in this instance, is in the form of a device in which energy is stored such as a spring having a connection with the frame and the axle and tending to strengthen the vehicle spring upon the separation of the axle and the frame and to weaken the vehicle spring upon movement of the frame and the axle toward each other. Provision is also made whereby this energized means increases its action on the vehicle spring with the increase in the separation of the axle and the frame and also increases its weakening action on the vehicle spring with the increase in the movement of the axle and frame toward each other, both from normal position. Provision is also made for limiting the separating movement between the axle and the vehicle frame as well as the movement toward and from each other both with a minimum amount of shock to the vehicle so as to prevent the breaking of the spring upon the separation of the axle and the frame, and the impact of the frame with the axle upon the movement of the frame and the axle toward each other, without at the same time interfering with the proper functioning of the vehicle spring. Provision is also made for retarding the movement of the frame and the axle to their normal position, this retarding movement being progressively decreased as the axle and frame approach normal position.

Referring to the illustrated embodiment of the invention 1 indicates the frame of the vehicle, 2 the axle and 3 the ordinary leaf spring interposed between the axle and the frame 1 which supports the usual body of suitable construction. In using the words "frame" and "axle" in the specification and claims it is to be understood that I am not using these words in a limited sense, but intend to cover any two parts of a vehicle connected by the vehicle spring.

In this instance, mounted on the frame is a housing comprising an end wall 4 having an attaching plate 5 secured by bolts 6 to the frame 1. The body 7 of the housing is bolted to the end wall at 8 and has a plugged opening 9 through which the lubricant may be introduced into the housing.

Within the housing is a means in which energy is stored. This means, in this instance, is in the form of a helical spring 10 mounted upon a support comprising two parts 11 and 12, the part 11 being in the form of a sleeve or tube in which a plunger part 12 slides. An abutment 13 may be provided on the support for one end of the spring while an abutment 14 is provided on the other support for the other end of the spring. The washer 13 is held on the support 11 by providing the support 11 with a surrounding annular groove 15 which receives a split washer 16, the abutment 13 having an annular recess 17 in its outer side for receiving the split washer 16 and holding the latter in the annular groove 15, thus permitting the washer 13 to be readily fitted in place or removed from the supporting part 11. The support for the spring, in this instance, is pivotally mounted at one end and with this end in view, there is provided at such end a ball or spherical portion 18 which rests in a socket 19 of an adjusting device 20 which with the removal of the cap 21 on the end of the housing and the removal of a lock nut 22 may be reached by turning in order to vary the compression of the spring 10 or the amount of energy stored in such spring.

The other end of the spring support connects with a movable member which is mounted in the housing. This member, in this instance, embodies a rock shaft 23 which at opposite ends is journalled in bushings 24 supported between the end wall 4 and the housing member 7. On this rock shaft is an arm 25 with bearings 26 projected from opposite sides thereof, and eccentric to the axis of rotation of the swinging member. These bearings 26 are engaged by laterally opening bearings 27 on two arms 28 which are projected from the spring supporting part 12. When the axis of the rock shaft 23 and the pivot of connection between the spring support and the swinging member and the pivotal connection between the swinging support and the housing are in alignment, then the spring is under its greatest compression, but when the pivot connection between the spring support and the swinging member is thrown to either side of the line, the spring tends to expand and the leverage on the arm increases in proportion to the distance the pivot connection between the support and the swinging member move away from such line. The spring support and the arm on the swinging member provide in effect a toggle.

The connection between the swinging member and the axle 2 is, in this instance, effected through a clamp 29 which is secured to the axle 2 and has a ball pivot 30 thereon which is received in a socket or spherical bearing 31 on one end of a thrust connection 32, in this instance, in the form of a bar or rod. The other end of this thrust connection has a ball socket bearing 33 which receives a ball pivot 34 eccentrically connected to the swinging member. In this instance, the ball pivot 34 is mounted on an arm 35 formed with a slot or groove 36 on its rear side adapted to receive a transversely extending guide member on the end of the rock shaft 23. The opposed faces of the arm 35 and the transverse guide 37 are corrugated at 38 and a screw 39 passes through a slot 40 in the arm 35 and into a screw opening 41 in the guide 38 to hold the adjustable arm 35 to the rock shaft 33 in an adjusted position. The thrust connection 32 is adjustable longitudinally or in other words is extensible and contractible. To this end, it is formed of two sections connected by a right and left hand internally threaded turn buckle 42 which is split and provided with clamping screws 43 to permit it to be firmly secured to the two parts of the thrust connection.

The arm 25 of the swinging member acts as a stop for limiting the relative movement between the axle and the frame toward each other and also away from each other. This is effected, in this instance, by situating the arm in proximity to the end wall 4 and providing on the end wall two resiliently mounted stop cushions each of which is, in this instance, in the form of a plunger 44 guided in the end wall 4 and pressed in one direction by a heavy spring 45. The two cushions are arranged one above and one below the axis of turning of the swinging member in such positions that the arm 25 when swung in either direction will engage one of such cushions before the pivotal connection between the swinging support of the spring and the swinging member has reached a dead center. The springs in the cushions are of such strength that they will be able to overbalance the spring 10, due to the fact, that by this time it has expanded and reduced the amount of energy stored therein and the relative movement between the axle and the frame have begun to slow down, thus reducing the impact between the arm 25 and the cushion to a minimum.

By adjusting the pivot connection of the thrust rod with the swinging member toward and from the axis of turning of the swinging member, it is possible to vary the amount of relative turning between the frame 1 and the axle 2. In other words, the pivotal connection with the thrust member may swing in a greater or lesser arc on a greater or lesser radius before the stopping action becomes effective. After the pivotal connection between the swinging member and the thrust member has been adjusted to determine the proper position for a certain vehicle, then the thrust member is extended or contracted to correspond to the adjustment of the pivotal connection in order that the frame and spring parts will not contact.

In connection with the apparatus it is desirable to provide a retarding means which will become effective upon the return of the frame and axle to normal position after a separation or a movement toward each other. Any suitable retarding means might be employed for this purpose but in the present instance, a retarding means is illustrated which is particularly adapted to the construction herein shown. To this end, the retarding means is carried by the plunger member 12 of the spring support and comprises two clutching devices 46 in the form of wedges arranged to cooperate with inclined surfaces 47 formed on opposite sides of the plunger 12. These clutching devices or wedges are so formed that they may, in one position, lie in the plane of the plunger 12 and substantially conform to the circumference of the plunger so that the plunger may be moved in one direction in the support 11 without causing any binding engagement between the interior wall of the spring supporting part 11, but, when moved in the other direction will ride upward on the inclined surfaces 47 and bind against the interior wall of the part 11 with a slipping but retarding action. In order that the wedges or clutching devices may have the tendency to move on the inclined surfaces to produce binding engagement a spring 48 may be introduced into a pocket 49 formed in the end of the plunger spring supporting part 12 and engaging at one end with abutments 50 on the clutching devices 46 and at the other end with a plug abutment 51 introduced into the outer end of the pocket 49. This retarding device is more effective or has the highest efficiency when the frame and the axle are most remote from normal position and becomes gradually less effective as it returns toward its normal position shown in Fig. 2. This is due to the fact that the action of the thrust rod on the swinging member has the least leverage on the friction means when at remote positions from normal and this leverage gradually increases as the swinging member gradually returns to normal position, as indicated in the diagrams shown in Figs. 2 to 5 inclusive.

The operation of the invention will be understood from the foregoing but it may be summarized as follows: A vehicle frame is equipped with four of these devices, two connected to the front axle on the opposite sides thereof of the frame and the other two connected to the rear axle frame on the opposite sides of the frame and as near as possible over the axles. The devices are adjusted to the type of vehicle and for obtaining the desired spring control as has been pointed out hereinbefore. When the wheels of the vehicle strike a depression a relative movement takes place between the frame and the axles. Upon this relative movement either toward one another as when an obstruction is met with or away from each other as when a depression is reached, a thrust rod or connection 32 imparts a swinging movement to a swinging member, moving the pivotal connection with the thrust rod upwardly as shown in Fig. 4 when a projection is met with and downwardly as shown in Fig. 5 upon reaching the depression. Under normal conditions, the parts lie substantially as shown in the diagram as illustrated in Fig. 3 to give a lifting effect which tends to cause the axle and the frame to move toward each other. In the diagram shown in Fig. 2, the power spring 10 has no effect on the vehicle spring 3.

The adjustment shown in Fig. 3 is adjacent the position shown in Fig. 2 so that the action of the spring 10 on the vehicle spring 3 is only slightly effective. As soon, however, as the pivotal connection and the swinging member shifts away from the postion shown in Fig. 2 in either direction the action of the spring 10 through the lever action gradually acts in the direction of movement between the axle and the frame 1 and in one case tends to weaken the spring 3 as shown in Fig. 4 and in the other case to strengthen the spring 3 as shown in Fig. 5 If the relative movement between the frame 1 and the axle 2 is extreme, then the stop arm 25 on the swinging member will cooperate with the stop cushions 44 and finally bring the relative movement between the frame and the axle to a stop without any jar. At the instant the relative motion between the axle and the frame is reversed after an extreme movement, the retarding device becomes active, it not having functioned when the axle and the frame are moving away from normal position. This retarding action of the retarding means as before pointed out is at its greatest efficiency as the frame and the axle start to move toward relative normal position. This is very desirable for the reason that, when the parts are in the position shown in Fig. 4 with the spring 3 near the frame, it tends to resist the expansion or fly back of the spring 3, whereas, when the parts are in the position shown in Fig. 5 this retarding means acts as an auxiliary supporting influence on the spring 3. With the return of the parts toward normal position, the braking or retarding action is favorably decreased as before pointed out while the resistance of the spring 10 is increased.

This invention makes a short spring more flexible and more like a long spring but retains the steering rigidity of a short spring. It stops the weave or roll of the car as would a full elliptic spring.

What I claim as my invention and desire to secure by Letters Patent is:

1. The combination with a frame, an axle, and a spring interposed between them, of means substantially inactive in power when in normal position for progressively increasing the strength of the spring as the frame and the axle move away from each other from normal position and for progressively weakening the action of the spring as the frame and axle move toward each other from normal position.

2. The combination with a frame, an axle, and a spring interposed between them, of means having energy stored therein substantially inactive in power when the frame and the axle are in normal position, and means for causing the energized means to increase the strength of the spring progressively as the frame and axle move away from each other from normal position, and for weakening the action of the spring progressively as the frame and the axle move toward each other from normal position.

3. The combination with a frame, an axle, and a spring interposed between them, of a swinging member mounted on one of the first two named parts, a thrust connection between the other of the first two named members and the swinging member to one side of its axis of swinging of the swinging member, and means also connected to the swinging member to one side of its axis of swinging for increasing the strength of the spring as the frame and axle move away from each other from normal position, and for weakening the action of the spring as the frame and axle move toward and from each other from normal position, said last mentioned two means being substantially inactive in power when the frame and the axle are in normal relative position.

4. The combination with a frame, an axle, and a spring interposed between them, of a power operated means substantially inactive in power when the frame and the axle are in normal relative position connected to the frame and the axle for increasing the strength of the spring as the frame and the axle move away from each other from normal position, and for weakening the action of the spring as the frame and the axle move toward each other from normal position.

5. The combination with a frame, an axle, and a spring interposed between them, of means in which energy is stored substantially inactive in power when the frame and the axle are in normal relative position, and means operated upon the relative movement between the axle and the frame for releasing the energized means to increase the strength of the spring as the frame and the axle move away from each other from normal position, and for releasing the energized means to weaken the action of the spring as the frame and the axle move towards each other from normal position.

6. The combination with a frame, an axle, and a spring interposed between them, of means in which energy is stored substantially inactive in power when the frame and the axle are in normal relative position, and means operated by the relative movement between the axle and the frame for releasing the energized means to strengthen the spring as the frame and the axle move away from each other from normal position.

7. The combination with a frame, an axle, and a spring interposed between them, of means in which energy is stored, substantially inactive in power when the frame and the axle are in normal relative position, and means operated by the relative movement between the axle and the frame for releasing the energized means to weaken the spring as the frame and the axle move toward each other from normal position.

8. The combination with a frame, an axle, and a spring interposed between them, of a swinging member, means in which energy is stored connected to said swinging member to one side of its axis of turning substantially inactive in power when the frame and the axle are in normal relative position, and means connected with the swinging member for shifting the latter upon the relative movement between the axle and the frame, to release the energized means to strengthen the spring as the frame and the axle move away from each other from normal position, and for releasing the energized means to weaken the spring as the frame and the axle move toward each other from normal position.

9. The combination with a frame, an axle, and a spring interposed between them, of means in which energy is stored substantially inactive in power when the frame and the axle are in normal relative position, a swinging member connected to one of the first two named parts and having the said energized means connected thereto to one side of its axis of turning, and a thrust connection also secured to said swinging member to one side of its axis of turning and also to the other of said first two named parts.

10. The combination with a frame, an axle, and a spring interposed between them, of a spring means in which energy is stored substantially inactive in power when the frame and the axle are in normal relative position, a swinging member supported on one of the first named parts and having the spring means connected thereto to one side of its axis of turning, and a thrust connection between the other of said first two named parts and the swinging member to one side of its axis of turning, so that upon the relative movement of the frame and the axle away from each other from normal position the spring means will increase the strength of the first named spring, and upon the relative movement of the frame and the axle toward each other the spring means will weaken the action of the first named spring.

11. The combination with a frame, an axle, and a spring interposed between them, of a member mounted for movement in opposite directions on one of said first two named parts, means in which energy is stored substantially inactive in power when the frame and the axle are in normal relative position, and having a connection with the movable member to release the energy therein when the swinging member is moved in either direction from a normal position, and means connecting said member with the other of the first two named parts to cause the member to move upon the relative movement between the frame and the axle away from normal position.

12. The combination with a frame, an axle, and a spring interposed between them, of a member mounted for movement on one of said first named parts in opposite directions, a spring in which energy is stored substantially inactive in power when the frame and the axle are in normal relative position, and having a connection with the movable member to release the energy in the spring when the member is moved in either direction in a normal position, and is stored in the spring as the member is moved toward normal position, and means for connecting said movable member with the other of the first two named parts to cause the member to move upon the relative movement between the frame and the axle upon normal position.

13. The combination with a frame, an axle, and a spring interposed between them, of a member mounted for movement in opposite directions on one of the first two named parts, a spring support having two relatively movable parts one of which is pivotally mounted and the other of which is connected to said movable member, a spring carried by said swinging support and held under compression between the two parts thereof in a substantially inactive condition when the frame and the axle are in normal relative position, and means for connecting said member with the other of the first two named parts to cause the member to move upon relative movement between the frame and the axle away from normal position in either of two directions to release the energy of the spring.

14. The combination with a frame, an axle, and a spring interposed between them, of a swinging member mounted for movement in opposite directions on one of the first two named parts, of a spring support formed of two slidingly connected parts, one of which is pivotally connected to the swinging member and the other of which is pivotally mounted, a spring on the support held between said sliding parts thereof under compression in a substantially inactive condition when the frame and the axle are in normal relative position, and a thrust connection between the other of the first two named parts and the swinging member.

15. The combination with a frame, an axle, and a spring interposed between them, of a swinging member mounted for movement in opposite directions on one of the first two named parts, means in which energy is stored connected to the swinging member and releasing the energy when the swinging member is moved in either of two directions from a normal position, a thrust connection between the swinging member to one side of the axis of said swinging member and the other of the first two named parts, and means for stopping the movement of the swinging member at two desirable points on opposite sides of its normal position.

16. The combination with a frame, an axle, and a spring interposed between them, of a swinging member mounted for movement in opposite directions on one of the first two named parts, means in which energy is stored connected to the swinging member and releasing the energy when the swinging member is moved in either of two directions from a normal position, a thrust connection between the swinging member to one side of the axis of said swinging member and the other of the first two named parts, and means for stopping the movement of the swinging member at two desirable points on opposite sides of its normal position, said stop means being resilient.

17. The combination with a frame, an axle, and a spring interposed between them, of a swinging member mounted for movement in opposite directions on one of the first two named parts, means in which energy is stored connected to the swinging member and releasing the energy when the swinging member is moved in either of two directions from a normal position, a thrust connection between the swinging member to one side of the axis of said swinging member and the other of the first two named parts, and means for stopping the movement of the swinging member at two desirable points on opposite sides of its normal position, and means for adjusting the pivotal connection of the thrust connection toward and from the axis of turning of the swinging member.

18. The combination with a frame, an axle, and a spring interposed between them, of a swinging member mounted for movement in opposite directions on one of the first two named parts, means in which energy is stored connected to the swinging member and releasing the energy when the swinging member is moved in either of two directions from a normal position, a thrust connection between the swinging member to one side of the axis of said swinging member and the other of the first two named parts, and means for stopping the movement of the swinging member at two desirable points on opposite sides of its normal position, and means for adjusting the pivotal connection of the thrust connection toward and from the axis of turning of the swinging member, and means for varying the length of the thrust connection for the purpose of determining the field of movement between the frame and the axle.

19. The combination with a frame, an axle, and a spring interposed between them, of means for increasing the strength of the spring as the frame and the axle move away from each other from normal position and for weakening the action of the spring as the frame and axle move toward each other from normal position, and means for retarding the relative movement between the frame and the axle toward normal position from either direction.

20. The combination with a frame, an axle, and a spring interposed between them, of a swinging member, means in which energy is stored connected to said swinging member to one side of its axis of turning, and means connected with the swinging member for shifting the latter upon the relative movement between the axle and the frame, to release the energized means to strengthen the spring as the frame and the axle move away from each other from normal position, and for releasing the energized means to weaken the spring as the frame and the axle move toward each other from normal position, and retarding means connected to the swinging member to retard the return movement of said member toward normal position from either direction.

21. The combination with a frame, an axle, and a spring interposed between them, of a member mounted for movement in opposite directions on one of the first two named parts, a spring support having two relatively movable parts one of which is pivotally mounted and the other of which is connected to said movable member, and a spring carried by said swinging support and held under compression between the two parts thereof, and means for connecting said member with the other of the first two named parts to cause the member to move upon relative movement between the frame and the axle away from normal position in either of two directions to release the energy of the spring, and retarding means interposed between the two parts of the spring support to retard the return movement of said movable member toward normal position from either direction.

22. The combination with a frame, an axle, and a spring interposed between them, of means in which energy is stored exerting a slight pressure when the frame and the axle are in normal position tending to move the axle and the frame toward each other, and means acting on the relative movement between the axle and the frame in either direction from normal position causing the energized means to increase its pressure to assist such movement away from normal position in either direction.

23. The combination with a frame, an axle and a spring interposed between them, of means in which energy is stored substantially inactive in power when the frame and the axle are in normal relative position, and means acting on the relative movement between the axle and the frame in either direction from normal position to cause the energized means to assist the movement away from normal position.

24. The combination with a frame, an axle, and a spring interposed between them, of means in which energy is stored, substantially inactive in power when the frame and the axle are in normal relative position, and means acting on the relative movement of the axle and frame away from each other from normal position to cause the energized means to assist such movement away from normal position and to resist the return of the axle and the frame to normal position.

25. The combination with a frame, an axle, and a spring interposed between them, of means in which energy is stored substantially inactive in power when the frame and the axle are in normal relative position, and means acting on the relative movement of the axle and the frame toward each other from normal position to cause the energized means to assist such movement away from normal position and to resist the return of the axle and the frame to normal position.

GEORGE H. TABER.